May 30, 1967

G. N. BLISS 3,322,301

METHOD AND APPARATUS FOR DENESTING ARTICLES BY SUCTION MEANS

Filed March 15, 1966

INVENTOR

GEORGE N. BLISS

BY Karl W. Flocks

ATTORNEY

May 30, 1967

G. N. BLISS 3,322,301

METHOD AND APPARATUS FOR DENESTING ARTICLES BY SUCTION MEANS

Filed March 15, 1966

INVENTOR

GEORGE N. BLISS

BY
KARL W FLOCKS

ATTORNEY

United States Patent Office 3,322,301
Patented May 30, 1967

3,322,301
METHOD AND APPARATUS FOR DENESTING ARTICLES BY SUCTION MEANS
George N. Bliss, Franklin, Mich., assignor to Diamond International Corporation, New York, N.Y., a corporation of Delaware
Filed Mar. 15, 1966, Ser. No. 534,476
3 Claims. (Cl. 221—1)

The present invention relates to a machine for dispensing stacked articles and has particular reference to an improved denesting device for dispensing articles such as molded pulp, paper or plastic trays one at a time from stacks.

Difficulty is often encountered in the denesting of trays, particularly molded pulp trays, in that occasional production and certain tray designs are subject to shrinkage, warpage, and other defects that affect their nesting interval or other dimensions that have been used as a reference in automatic denesting devices of the prior art.

Accordingly, the present invention is directed to an apparatus and a method that is reliable and of simple construction and that will readily lend itself to full adjustability for different tray sizes. The invention seeks to provide a novel method and means of dispensing articles such as molded pulp, paper, or plastic trays individually from stacks with the reliability which is needed in high speed operations.

It is also an object of this invention to handle stacks of articles with varying nesting intervals without any loss of dispensing efficiency. The present invention has been found highly reliable on a wide variety of sizes, shapes and irregular nesting intervals and has a wide tolerance for tray warpage variables.

This invention presents a method for separation of nested articles in a simple and direct manner regardless of varying nesting intervals.

Basically the present invention provides a novel and improved denesting device which applies a distortion to a tray prior to its removal from a stack through the use of vacuum cup means on one portion of the tray and restraining means on another portion thereby distorting the tray and easily removing it from a stack of nested trays.

The above and other objects and advantages of the invention will become apparent upon full consideration of the following detailed description and acccompanying drawings in which.

Figure 1:
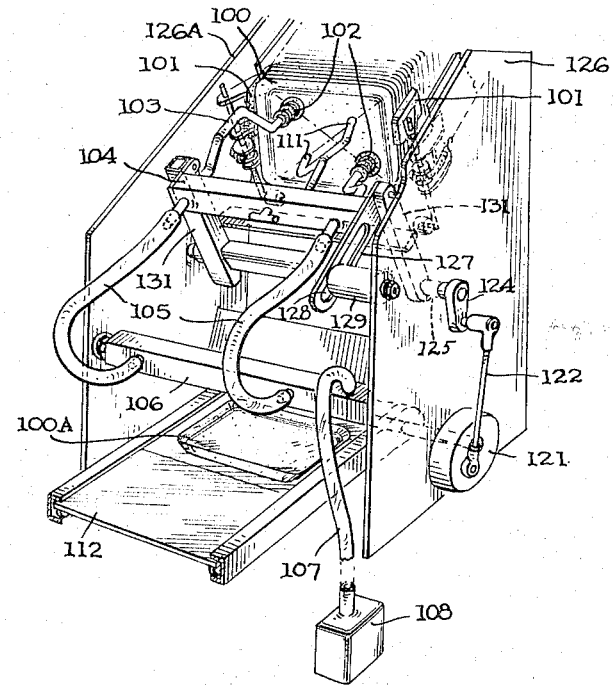
FIG. 1 is a perspective view of denesting equipment in accordance with the present invention.
Figure 5:
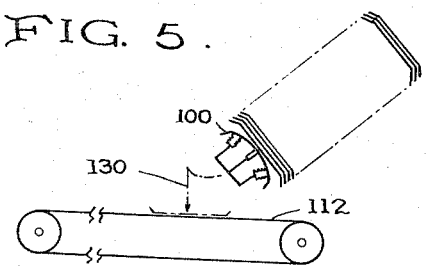
FIGS. 5–8 are diagrammatic views of denesting machines showing some of the possible relative positions of the nested articles to be separated.
Figure 7:
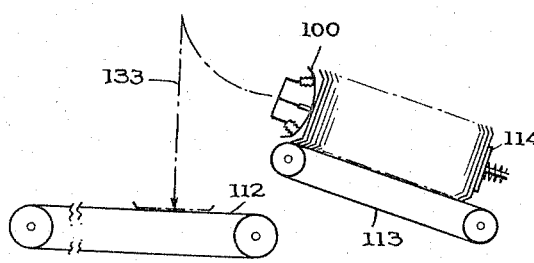
Figure 8:
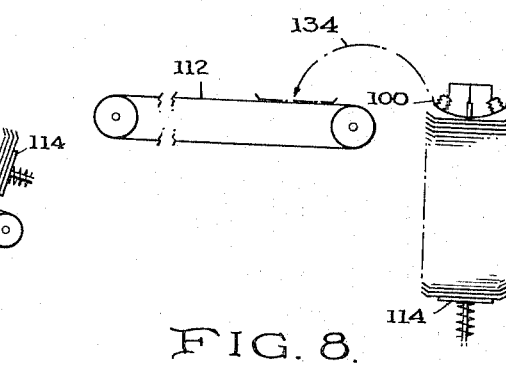

Referring first to the perspective view of the denesting machine in FIG. 1, it will be noted that the stacked articles, which are trays in this embodiment, are positioned as shown diagrammatically in FIG. 5. The trays are supported in their stacked position by stack grippers 101 so positioned against the sides of the trays so as to prevent the stack from falling, and through the gear movement to allow the tray 100 being peeled from the stack to be removed therefrom while continuing the support of the remaining stacked trays. Some such sort of stack gripper may be required in the embodiment shown in FIG. 6 but the embodiments of FIGS. 7 and 8 would make use of gravity and therefore would not require such gripping action.

In the embodiment shown in FIG. 1, bellows type suction cups 102 are connected by hollow rigid rods 103 to transverse arm 104 and pass through arm 104 to hollow flexible tubing 105 to hollow transverse member 106 which has a connection through tube 107 to a vacuum supply source 108. Also connected to transverse arm 104 is restraining rod 110 having ends 111 positioned against the bottommost tray 100.

When the bottommost tray 100 is peeled from the stack it is then carried by suction cups 102 to the position shown by tray 100A on conveyor 112. Both the peeling of the bottommost tray 100 from the stack and its placement on conveyor 112 is performed through the motion of linkage wherein wheel 121 rotated by motor means (not shown) moves connecting rod 122 attached to lever member 124 connected on shaft 125 through supporting wall 126 of the machine to link arm 131. Linkage arm 127 is pivotally connected to form a V shape with link arm 131 and has a slot 128 therein at its end away from its connection to arm 131 which rides on support 129 connected on supporting wall 126. Transverse arm 104 has one of its ends connected substantially at the midpoint of the V shape connection of link arm 131 and linkage arm 127. The opposite end of transverse arm 104 is supported by a pivotal connection with a second link arm 131 near supporting wall 126A which also has its opposite end attached for rotation with shaft 125 as does the first link arm 131 near where shaft 125 is rotatably supported by supporting wall 126A.

In the operation of the denesting machine suction cups 102 and the end or ends 111 of restraining rod 110 are placed in contact with the bottommost tray 100, or the tray 100 which is to be denested from the stacks which may be positioned in any of several different ways, some of which are illustrated in FIGS. 5–8.

Figure 2:
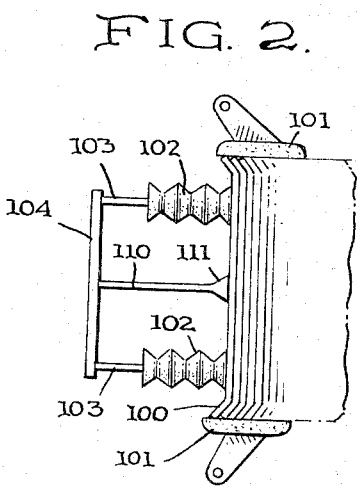
FIGS. 2 and 3 are enlarged views of denesting equipment showing successive steps in the denesting of the articles.
Figure 3:
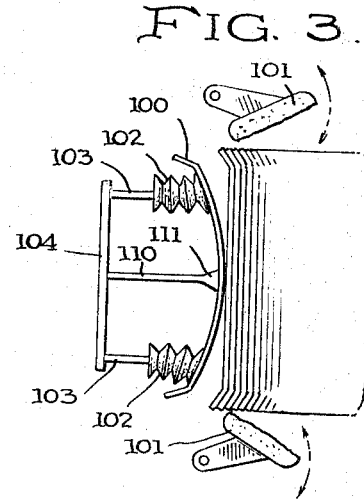
Figure 4:
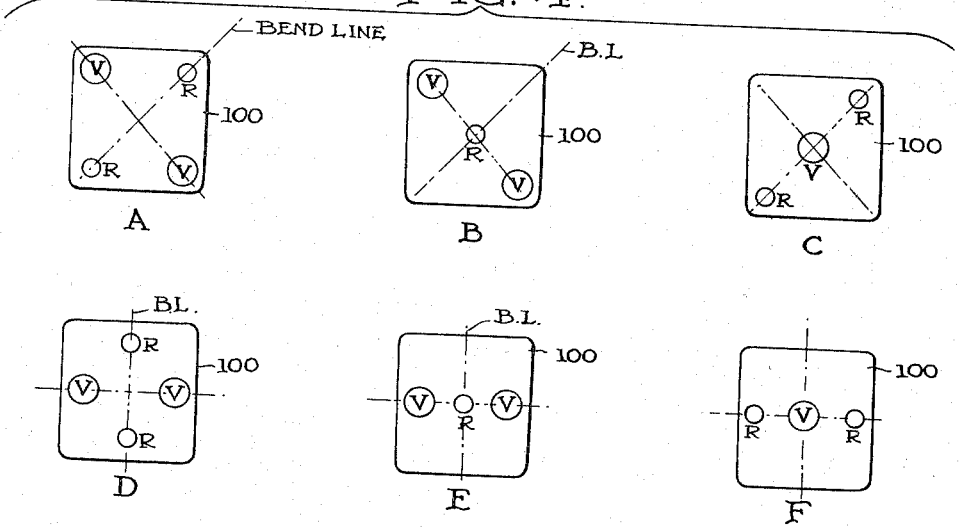
FIGS. 4A–4F are illustrative of some alternate arrangements of elements of denesting equipment of the present invention.

With the bellows type suction cups 102 and the ends 111 of restraining rod 110 placed in contact tray 100 as illustrated in FIG. 2, the vaccum supply source 108 produces a vacuum through tube 107, hollow transverse member 106, hollow flexible tubing 105 and hollow rigid rods 103 to suction cups 102 causing the suction cups 102 to grip tray 100 and at the same time to collapse as shown in FIG. 3. While movement of tray 100 away from the stack takes place at the outer portions of this tray, the center portion remains held against the stack by restraining rod 110, thereby causing a peeling action removing tray 100 from the remaining stack of nested trays as illustrated in FIG. 3.

Wheel 121 is then caused to rotate by motor means. This causes a reciprocating movement of connecting rod 122 which through lever member 124, shaft 125, V-connected link arm 131 and linkage arm 127 and transverse arm 104 cause the movement of hollow rigid rods 103 and restraining rod 110, the suction cups 102 and ends 111 of restraining rod 110, respectively, to move with tray 100 away from the stack of nested articles and then to a position over conveyor 112 at which time vacuum supply source 108 will allow entry of air into the vacuum system so as to release the tray onto conveyor 112.

Because of the use of the bellows type suction cups 102 in conjunction with restraining rod 110 the need for relative movement between the cup supports, i.e. hollow rigid rods 103, and restraining rod 110 to produce the tray distortion shown in FIG. 3 has been eliminated. One set of relationships that may be used between the number and positions of suction cups 102 connected to a vacuum system to the number and positions of restraining rod or rods 110 with their ends 111 is such that a line drawn through points of contact of suction cups 102 designated in FIGS. 4A–4F by the circle and letter V intersects a line drawn through the points of contact of ends 111 of restraining rod or rods 110, designated by the circle and letter R. In FIGS. 4A, 4B, 4D and 4E the line drawn through contact points R has in each case been designated as the line along which bending of the tray 100 will take place. Due to the collapsing action of suction cups 102 the bending line is differently placed for examples shown in FIGS. 4C and 4F but a peeling action will also take place with this positioning of vacuum and restraining elements but there may be some interference with the remaining stacked articles in these latter combinations. Other combinations and numbers of vacuum and restraining elements may be used in keeping with the present invention, such as placement of vacuum and restraining elements along lines of parallel relationship to each other wherein cantilever forces would be used for denesting the stacked articles, but only a limited number of embodiments have been illustrated in the figures.

When the stacked articles are positioned as shown in FIG. 5, where it is desired to remove the bottommost article the restraining element such as rod 110 not only aids in the peeling operation but also holds the whole stack in its holder while the bottommost article is peeled off and until a stack gripper returns to a position to support the remainder of the stack. The restraining and vacuum elements then move tray 100 peeled from the stack through a general path 130 so as to place the peeled article on conveyor 112. The advancement of the stack so as to place the next bottommost tray in a position to be denested is accomplished through the action of gravity.

Figure 6:
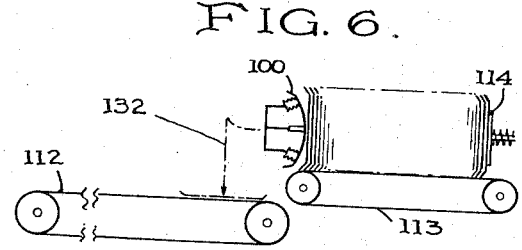

The advancement of the stack to position the next tray for removal therefrom in the embodiment of FIG. 6 is accomplished through the cooperative action of conveyor 113 and push rod 114. The vacuum and restraining elements then move the tray generally through the path 132 to conveyor 112.

Instead of the stack moving in a horizontal direction as shown in FIG. 6, it may be moved up a slight incline through the use of the same conveyor 113 and push rod 114 with the tray 100 peeled from the top of the stack and then moved by the vacuum and restraining elements generally through a path 133 onto conveyor 112.

Portions and structure of the equipment used may vary to accommodate to the different setups even as illustrated in FIGS. 5–8 but in general the denesting action is as follows: A stack of containers is held by a stack gripping means such as self-powered gripper pads or reciprocated fingers or, alternatively, the stack of containers is maintained without any stack gripping means by removing the trays from the top of an inclined stack in cooperation with a stack level control means. Or a stack gripping means may be eliminated through carrying the stack on a conveyor, either level or inclined, that is indexed for movement in accordance with the movement of the tray restraining means.

The next step in the denesting action takes place when the suction cup or cups connected to a vacuum system are brought in contact with the end container of the stack. The tray removing suction means may be the bellows vacuum or suction cups such as illustrated by cups 102 or a cup and spring combination which would act in a similar manner.

A tray restraining means is also brought into action against the same container. These tray restraining means may be rigid abutments on the vacuum cup assembly such as restraining rods 110 illustrated or, in the alternative, may be movable abutments also attached on the vacuum cup assembly, or reciprocating fingers positioned at the end of the container stack. In these latter cases a different tray removing suction means could also be used such as fixed vacuum cups.

At this point in the denesting operation, if there is a stack gripping means used, this stack gripping means is released and the stack is supported by the tray restraining means. Vacuum is now applied to the suction means from a vacuum supply source.

The suction means applies a removal force to the tray but where the tray and the stack are supported by the tray restraining means there is no full separation of that tray from the stack until the stack gripping means is reapplied to the remaining trays. In the combinations using more than one suction means the tray tends to bend along the line drawn through the restraining means contact points with the tray. This distortion of the tray opens opposed gaps between it and the stack, and the stack gripping means, if one is used, is re-engaged on the remainder of the stack. The tray restraining means is then retracted from its stack supporting position and the tray is dispensed to a following conveyor.

Other articles besides the trays illustrated may be used with this invention merely providing that they possess sufficient surface structure to cooperate with the suction and restraining means.

The material from which the stacked articles may be made which are denested in the manner of this invention may vary providing that there is sufficient flexibility to allow the peeling of the articles from the stack.

It will be obvious to those skilled in the art that various changes may be made without departing from the scope of the invention and therefore the invention is not limited to what is shown in the drawings and described in the specification but only as indicated in the appended claims.

What is claimed is:

1. A dispensing machine for separating by peeling stacked temporarily bendable perimetrically defined articles comprising:

article restraining means adapted to contact a portion of one of said stacked articles with the place of contact within the perimeter of the article being contacted, peeling suction means located on opposed sides of a line parallel to the general surface of said stacked articles which line passes through said restraining means, which peeling suction means are adapted to engage different discrete portions of the same said one of said stacked articles, means to apply relative movement between said peeling suction means and said restraining means so as to move said peeling suction means away from the stack and said stacked articles while holding said restraining means against the stack of said stacked articles, thereby effecting a limited bending of the same said one of said stacked articles in the area between its perimeter and the place where said restraining means is against the stack, the distance between the said place of contact and the perimeter of the same said one of said stacked articles being not more than one-half the length of a line passing through two points on the perimeter of said article and the place of contact so that the amount of temporary bending which takes place is limited, and stack gripping means located immediately adjacent the stacked articles for releasing said stacked articles during said relative movement between said restraining means and said peeling suction means, whereby said one of said stacked articles is temporarily bent only in the area between said line passing through said restraining means and its perimeter and whereby portions of said one of said stacked articles on opposed sides of said line are simultaneously peeled in a direction from the perimeter of said article toward a place within the perimeter and whereby the amount of displacement effected during said peeling action is limited and when all of said peeling is effected the place of contact by the restraining means is exposed on more than one side by released area of said one of said stacked articles.

2. The dispensing machine of claim 1 further characterized by a common mounting means for said article restraining means and said peeling suction means,
said common mounting means including
- a rotatable shaft,
- means to rotate said shaft,
- a pair of linkage arms extending substantially perpendicularly from said shaft near opposite ends of said shaft,
- a transverse arm mounted between said pair of linkage arms and pivotally connected thereto,
- a link arm pivotally connected to at least one of said pair of linkage arms to form a V connection thereto and having a slot therein,
- and a stationary mounting having a portion passing through and riding in said slot,
- said article restraining means and said peeling suction means attached to said transverse arm.

3. A method of denesting a stack of temporarily bendable perimetrically defined articles supported in clamped position which comprises the steps of
- contacting and gripping the surface of the article to be denested with the place of contact within the perimeter of the article being contacted, and the gripping on opposed sides of a line parallel to the general surface of the article to be denested which line passes through the place of contact,
- unclamping of the support of said stack of articles,
- effecting a limited temporary bending of the article to be denested in the area from its perimeter to said line passing through said place of contact with a simultaneous peeling of portions of said article to be denested on opposite sides of said line in a direction from the perimeter of said article toward a place within the perimeter until the peeling exposes said place of contact on more than one side by released area of said article to be denested,
- clamping said stack of articles to resupport the stacked articles in clamped position,
- and removal of the article to be denested from all remaining contact with the remainder of the stack.

References Cited

UNITED STATES PATENTS

| | | | |
|---|---|---|---|
| 1,204,188 | 11/1916 | Pye | 221—211 X |
| 2,745,665 | 5/1956 | Labombarde | 271—26 |
| 2,770,392 | 11/1956 | Roberts | 221—251 X |
| 2,840,270 | 6/1958 | Gore | 221—211 |
| 2,954,900 | 10/1960 | Brubaker | 221—211 |
| 3,039,767 | 6/1962 | Staines | 271—26 |
| 3,104,780 | 9/1963 | Carter et al. | 221—223 |
| 3,275,189 | 9/1966 | Goldsborough | 221—211 X |

WALTER SOBIN, *Primary Examiner.*